June 5, 1951  H. W. GRAYBROOK  2,555,539
REGULATING SYSTEM
Filed Jan. 5, 1950
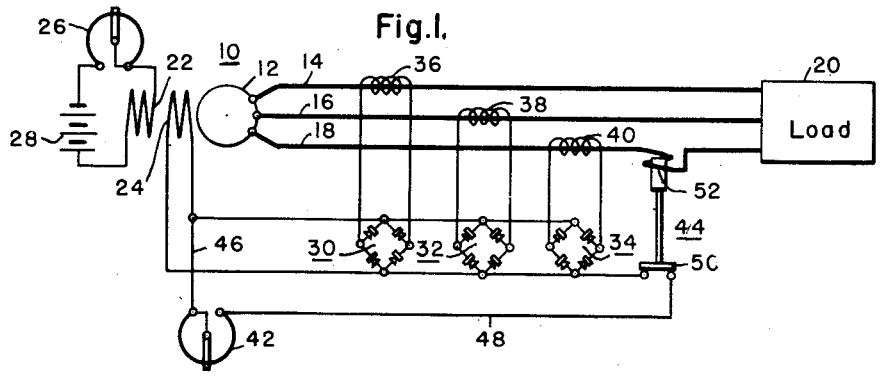
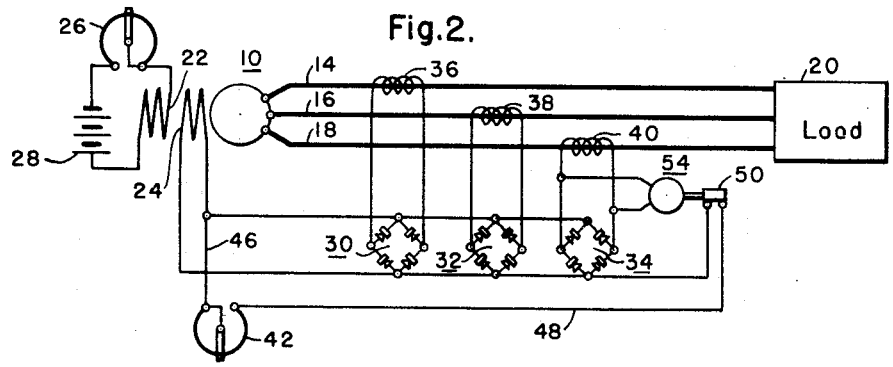
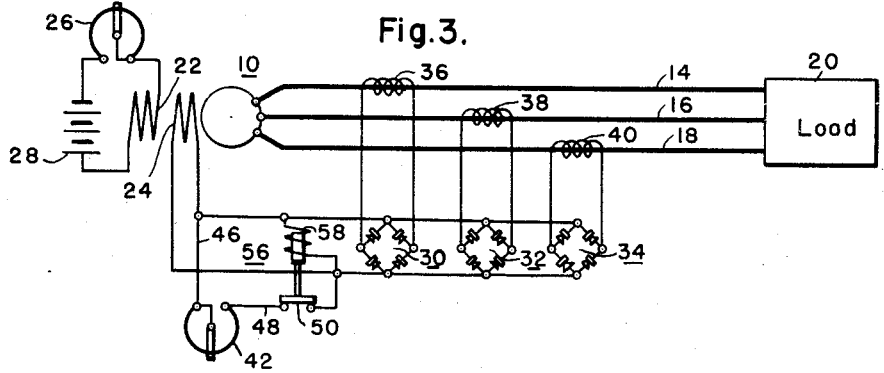
WITNESSES:
INVENTOR
Herbert W. Graybrook
BY
ATTORNEY Patented June 5, 1951

2,555,539

UNITED STATES PATENT OFFICE 2,555,539

REGULATING SYSTEM

Herbert W. Graybrook, Irwin, Pa., assignor to Westinghouse Electric Corporation, East Pittsburgh, Pa., a corporation of Pennsylvania Application January 5, 1950, Serial No. 136,909

7 Claims. (Cl. 322—27)

This invention relates to regulating systems, and in particular to the regulation of the voltage of an alternating-current generator supplying a variable load.

Where an alternating-current generator is utilized for supplying power to a motor-generator set or the like, it is found that under the heavy starting load of the motor-generator set, the voltage of the alternator decreases. Similar operating conditions are found where the load becomes great enough to cause the load voltage to drop below a predetermined value.

An object of this invention is the provision in a regulating system for an alternating-current generator having a main field winding and an auxiliary field winding, for changing the current flow in the auxiliary field winding in accordance with changes in the load current.

Another object of this invention is the provision in a regulating system for an alternating-current generator having a main field winding and an auxiliary field winding, for normally connecting a resistor in parallel shunting relation with the auxiliary field winding to limit the flow of current therein, and to disconnect the resistor shunt upon the flow of predetermined load current to increase the energization of the auxiliary field winding.

Other objects of this invention will become apparent from the following description, when taken in conjunction with the accompanying drawing, in which:

Figure 1 is a diagrammatic view of circuits and apparatus embodying the teachings of this invention;

Fig. 2 is a diagrammatic view of circuits and apparatus illustrating another embodiment of this invention; and Fig. 3 is a diagrammatic view of circuits and apparatus illustrating a further embodiment of this invention.

Referring to the drawing, and in particular to Figure 1 thereof, this invention is illustrated in connection with controlling the voltage of an alternating-current generator 10. The alternating-current generator 10 comprises an armature 12 connected by conductors 14, 16 and 18 to supply a load 20, such as a motor-generator set (not shown), and a main field winding 22 and an auxiliary field winding 24. In this instance, the main control field winding 22 is connected through an adjustable field rheostat 26 to a suitable source of direct current, such as a battery 28.

The auxiliary field winding 24 is disposed and connected to be of the same polarity as that of the main field winding 22. As illustrated, the auxiliary field winding 24 is connected to be energized in accordance with the flow of the load current in the conductors 14, 16 and 18. Thus, the auxiliary field winding 24 is connected across the output terminals of full wave rectifiers 30, 32 and 34, the input terminals of which are connected across current transformers 36, 38 and 40, respectively, which are disposed in inductive relation with load conductors 14, 16 and 18, respectively.

In order to control the flow of current in the auxiliary field winding 24, an adjustable resistor 42 is disposed to be connected in parallel shunt relation with the auxiliary field winding 24. As illustrated, a contactor 44 is employed for the purpose of controlling the connecting of the resistor 42 in such shunting relation with respect to the auxiliary field winding 24. Thus, one end of the resistor 42 is connected as by conductor 46 to one end of the auxiliary field winding 24, the other end of the resistor 42 being connected as by conductor 48 through a contact member 50 of a contactor 44 to the other end of the auxiliary field winding 24.

As illustrated, the contactor 44 is also provided with a winding 52 which is disposed to be energized to effect an operation of the contactor 44 to actuate the contact member 50 thereof to a circuit-interrupting position. In this instance, the winding 52 comprises one or more turns of the load conductor 18 whereby the contactor 44 is energized in direct dependence upon the load current. However, the contactor 44 is so designed that for normal values of load current up to a predetermined value, the contact member 50 of the contactor 44 is maintained in its circuit closing position; and that upon the occurrence of the predetermined value of load current, the contactor 44 is so energized that its contact member 50 is actuated to a circuit-interrupting position.

In operation, the energization of the main field winding 22 is adjusted by means of the rheostat 26 so that a predetermined voltage is obtained from the alternating-current generator 12 at normal speed and at no-load. When the load is applied to the generator 10, current flows through the current transformers 36, 38 and 40 and a proportionate rectified current flows from the output terminals of the rectifiers 30, 32 and 34, respectively, through the auxiliary field winding 24 to maintain the excitation of the generator 10 to maintain a predetermined output voltage therefrom. Since the resistor 42 is connected in parallel circuit relation with the auxiliary field winding 24, it will of course be appreciated that the resistor 42 shunts a part of the current flow from the auxiliary field winding. The resistor 42 can be adjusted in order to maintain sufficient flow of current through the field winding 24 to maintain the output voltage of the generator 10 at a predetermined value.

When an abnormal load is encountered, resulting in the flow of current of a predetermined value in the load conductors 14, 16 and 18, the winding 52 of the contactor 44 is so energized as to actuate the contact member 50 to a circuit-interrupting position to disconnect the resistor 42 from its shunting parallel relation with the auxiliary field winding 24 whereby the full value of rectified current flows from the rectifiers 30, 32 and 34 through the auxiliary field winding 24 to increase the energization of the field winding 24 and so increase the excitation of the generator 10 that the output voltage thereof approaches the predetermined value which is to be maintained. Of course, as soon as the abnormal load condition disappears and the flow of current in the load conductors decreases to below the predetermined value, the energization of the winding 52 is insufficient to maintain the contactor 44 in a circuit-interrupting position with the result that the contact member 50 drops to a circuit closing position to again establish the shunt of the resistor 42 in parallel with the auxiliary field winding 24.

In another embodiment of this invention illustrated in Fig. 2 of the drawing, the same numerals are used for designating like parts of the circuit comparable to the circuit of Figure 1. In this embodiment, the only distinction is that an alternating-current relay 54 of the inductive type is employed instead of the alternating-current contactor 44 of the system of Figure 1. In this instance, the alternating-current relay 54 is connected across the output terminals of the current transformer 40 whereby the relay 54 is energized by a measure of the load current since the secondary current of the transformer 44 is always proportional to the load current flowing in conductor 18. The alternating-current relay 54 operates in the same manner as the contactor 44 being responsive to a measure of the load current when the load current exceeds a predetermined value to actuate the contact member 50 to a circuit-interrupting position; and upon the occurrence of a load current below the predetermined value, the contact member 50 is returned to the circuit closing position to thereby control the parallel shunting connection of the adjustable resistor 42 with respect to the auxiliary field winding 24.

Another embodiment of this invention is illustrated in Fig. 3 in which the same numerals are used for identifying identical components of the systems of Figs. 1 and 2, the distinction in the embodiment of Fig. 3 being the use of a direct-current contactor 56 instead of the alternating-current contactor 44 of the system of Figure 1 and the alternating-current relay 54 of the system of Fig. 2. In this embodiment, the energizing winding 58 of the contactor 56 is connected directly across the output terminals of the rectifiers 30, 32 and 34 whereby the winding 58 is energized by a measure of the load current of the conductors 14, 16 and 18 as rectified by the rectifiers 30, 32 and 34, respectively. The contactor 56 functions in the same manner as the contactor 44 to control the shunting connection of the adjustable resistor 42 with the auxiliary field winding 24 in response to a predetermined value of load current.

In all of the embodiments illustrated, it is quite apparent that the control of the connections of the adjustable resistor 42 in shunt with the auxiliary field winding 24 give a very sensitive control of the excitation of the generator 10 under a predetermined load condition to thereby control the output voltage of the generator. By increasing the energization of the auxiliary control field winding 24 under abnormal load conditions, the field winding 24 being of the same polarity as that of the main field winding 22, it is apparent that the excitation of the generator 10 is so controlled or regulated as to maintain approximately a normal predetermined voltage on the generator 10. In each of the embodiments, the system is composed of standard components and can be readily reproduced. An efficient regulation of the voltage of the generator is thus obtained with a minimum of components.

I claim as my invention:

1. In a regulating system for an alternating-current generator provided with a main field winding and an auxiliary field winding, the generator being connected through conductors to supply a load, the combination comprising, a resistor disposed to be normally connected in parallel relation with the auxiliary field winding to limit the current flow therein to a predetermined value for a predetermined value of load supplied by the generator, means for effecting a flow of current in the parallel connected auxiliary field winding and resistor dependent upon the load current, and means disposed to be operative in response to a predetermined load condition to interrupt the parallel connection of the resistor with the auxiliary field winding to effect an increase in the flow of current through the auxiliary field winding.

2. In a regulating system for an alternating-current generator provided with a main field winding and an auxiliary field winding, the generator being connected through conductors to supply a load, the combination comprising, an adjustable resistor disposed to be normally connected in parallel shunting relation with the auxiliary field winding to limit the flow of current therein to a predetermined value for a predetermined value of load supplied by the generator, means including a current transformer and rectifying means connected in circuit relation between the load conductors and the parallel connected auxiliary field winding and resistor for effecting a flow of current therein dependent upon the load current, and means disposed to be operative in response to a predetermined load condition to interrupt the parallel shunting connection of the resistor with the auxiliary field winding to effect an increase in the flow of current through the auxiliary field winding whereby such flow of current is a direct measure of the load condition.

3. In a regulating system for an alternating-current generator provided with a main field winding and an auxiliary field winding, the generator being connected through conductors to supply a load, the combination comprising, a resistor, a contactor disposed to normally connect the resistor in parallel shunting relation with the auxiliary field winding to limit the flow of current therein to a predetermined value for a predetermined value of load supplied by the generator, means for effecting a flow of current in the parallel connected auxiliary field winding and resistor dependent upon the load current, and means for energizing the contactor in response to a predetermined load condition to effect the operation thereof to interrupt the parallel shunting of the resistor with the auxiliary field winding to effect an increase in the flow of current through the auxiliary field winding whereby the auxiliary field winding is energized in direct relation with respect to the load condition.

4. In a regulating system for an alternating-current generator provided with a main field winding and an auxiliary field winding, the generator being connected through conductors to supply a load, the combination comprising, a resistor disposed to be normally connected in parallel relation with the auxiliary field winding to limit the current flow therein to a predetermined value for a predetermined value of load supplied by the generator, means for effecting a flow of current in the parallel connected auxiliary field winding and resistor dependent upon the load current, and switching means responsive to a predetermined measure of the load current disposed for operation to disconnect the resistor from its parallel connection with the auxiliary field winding to thereby effect an increase in the flow of current through the auxiliary field winding.

5. In a regulating system for an alternating-current generator provided with a main field winding and an auxiliary field winding, the generator being connected through conductors to supply a load, the combination comprising, a resistor, a contactor having a contact member normally disposed to connect the resistor in parallel shunting relation with the auxiliary field winding to limit the flow of current therein to a predetermined value for a predetermined value of load supplied by the generator, means for effecting a flow of current in the parallel connected auxiliary field winding and resistor dependent upon the load current, and a winding for the contactor disposed in circuit relation with the load conductors to be so energized in response to a predetermined flow of load current to actuate the contact member to a circuit-interrupting position to disconnect the resistor shunt from the auxiliary field winding to thereby effect an increase in the flow of current through the auxiliary field winding.

6. In a regulating system for an alternating-current generator provided with a main field winding and an auxiliary field winding, the generator being connected through conductors to supply a load, the combination comprising, a resistor, a contactor disposed to normally connect the resistor in parallel shunting relation with the auxiliary field winding to limit the flow of current therein to a predetermined value for a predetermined value of load supplied by the generator, means including a current transformer and rectifying means connected in circuit relation between the load conductors and the parallel connected auxiliary field winding and resistor for effecting a flow of current thereto dependent upon the load current, and means for energizing the contactor in response to a predetermined flow of load current to effect the operation thereof to interrupt the parallel shunting connection of the resistor with the auxiliary field winding to effect an increase in the flow of current through the auxiliary field winding under such load conditions whereby the auxiliary field winding is energized in direct relation with respect to the load current.

7. In a regulating system for an alternating-current generator provided with a main field winding and an auxiliary field winding, the generator being connected through conductors to supply a load, the combination comprising, a resistor, a contactor having a contact member normally disposed to connect the resistor in parallel shunting relation with the auxiliary field winding to limit the flow of current therein to a predetermined value for a predetermined value of load supplied by the generator, means including a current transformer and rectifying means connected in circuit relation between the load conductors and the parallel connected auxiliary field winding and resistor for effecting a flow of current thereto dependent upon the load current, and a winding for the contactor disposed in circuit relation with the load conductors to be so energized in response to a predetermined flow of load current to actuate the contact member to a circuit-interrupting position to disconnect the resistor shunt from the auxiliary field winding to thereby effect an increase in the flow of current through the auxiliary field winding.

HERBERT W. GRAYBROOK.

No references cited.